Fig.1.

Sept. 27, 1955 P. V. STEWART 2,719,251
SWITCHBOARD
Filed Feb. 4, 1952 6 Sheets-Sheet 3

WITNESSES:
Robert C. Baird
Rev. C. Groove

INVENTOR
Perry V. Stewart.
BY 
ATTORNEY

Sept. 27, 1955  P. V. STEWART  2,719,251
SWITCHBOARD
Filed Feb. 4, 1952  6 Sheets-Sheet 4

INVENTOR
Perry V. Stewart.
BY
ATTORNEY

United States Patent Office 2,719,251
Patented Sept. 27, 1955

2,719,251

SWITCHBOARD

Perry V. Stewart, Chicago, Ill., assignor to Westinghouse Electric Corporation, East Pittsburgh, Pa., a corporation of Pennsylvania Application February 4, 1952, Serial No. 269,702

28 Claims. (Cl. 317—120)

This application is a continuation-in-part of my application, Serial No. 160,704, filed May 8, 1950, which has now become abandoned.

My invention relates, generally, to switchboards and, more particularly, to enclosed switchboards for housing control apparatus of the type utilized for controlling distribution circuits which are connected to various electric power utilizing devices.

Since industrial plants usually contain electric motors, and other power utilizing devices, of different sizes, the control apparatus for controlling the devices must be of correspondingly different sizes. Furthermore, the devices in a plant are sometimes changed, thereby making it necessary to change the control apparatus. In the interest of economy, numerous attempts have been made by switchboard manufacturers to standardize the switchboard control panels for such apparatus.

An object of my invention is to provide for centralizing and enclosing control apparatus, particularly motor control apparatus.

Another object of my invention is to provide a standardized switchboard housing unit which may be installed individually or assembled in groups containing any desired number of housing units.

A further object of my invention is to provide a switchboard housing assembly which will accommodate any desired combination of motor starters or other control apparatus units.

Still another object of my invention is to provide for adding, changing or removing control units in a switchboard housing assembly.

A still further object of my invention is to simplify the wiring of a switchboard housing having a plurality of control units therein.

Another object of my invention is to provide for locking a control unit in the disconnected position in a switchboard housing.

A more general object of my invention is to provide a switchboard housing for control apparatus units which shall be simple and efficient in operation and which may be economically manufactured and installed.

Other objects of my invention will be explained fully hereinafter or will be apparent to those skilled in the art.

In accordance with one embodiment of my invention, the side sheets of a switchboard housing unit are provided with vertically disposed adapters which support the control apparatus units and the insulators for the vertical bus bars. Each apparatus unit has oppositely disposed pivot pins at its bottom which are inserted into slotted and notched supports secured to the adapters. Each unit has electrical connectors of the stab type which engage the vertical bus bars when the unit is secured in position by cam-type fasteners on the adapters. A unit may be locked in the disconnected position by a locking plate which engages a flange on one of the side sheets.

For a better understanding of the nature and objects of the invention, reference may be had to the following detailed description, taken in conjunction with the accompanying drawings, in which.

Figure 1:
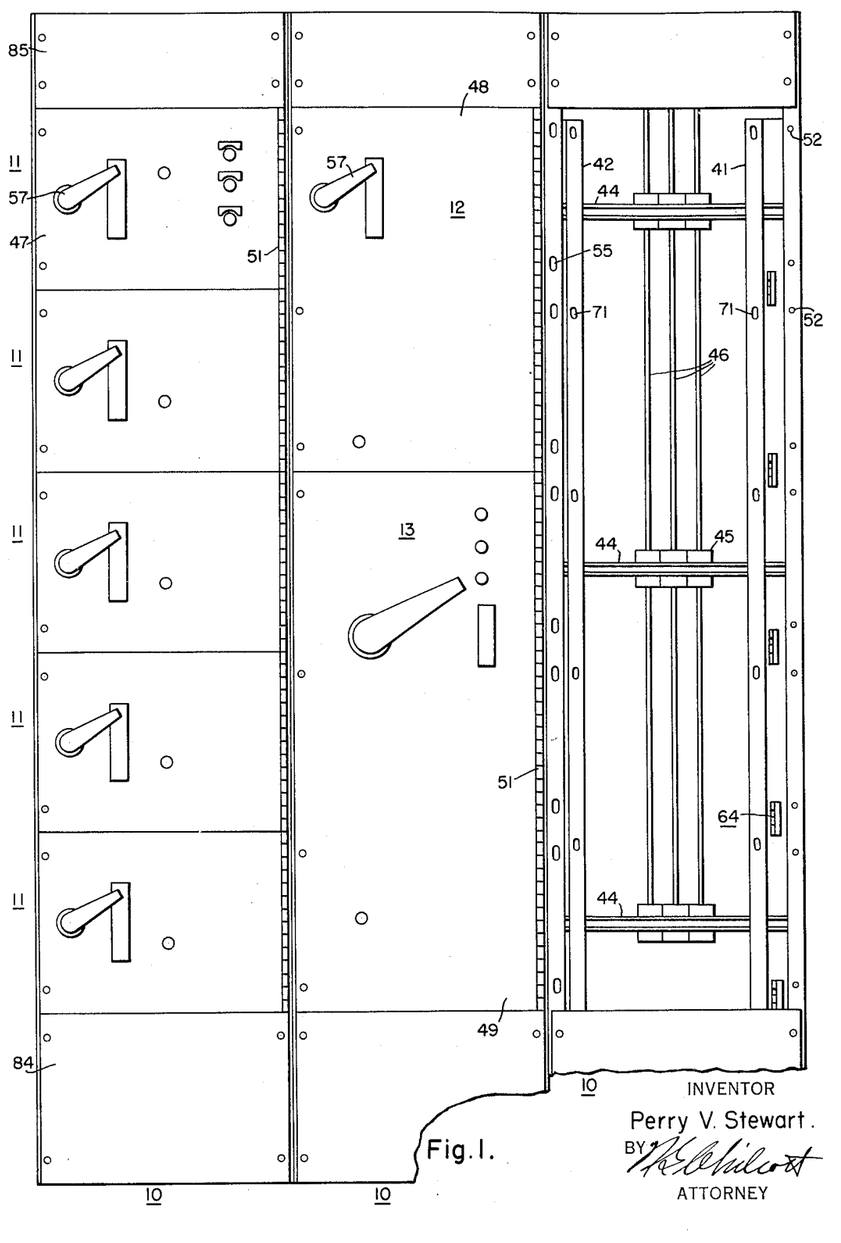
Fig. 1 is a view in front elevation, of a switchboard housing structure embodying the principal features of my invention, parts of the structure being removed for clearness.

Referring to the drawings, and particularly to Fig. 1, the switchboard structure shown therein comprises a plurality of housing sections 10 which are disposed in side-by-side relation. The housing sections are preferably of uniform height, depth and width and may be used singly or in groups as shown. In order to simplify the drawings only three housing sections have been shown. However, it will be understood that as many sections as is desired may be provided.

Figure 5:
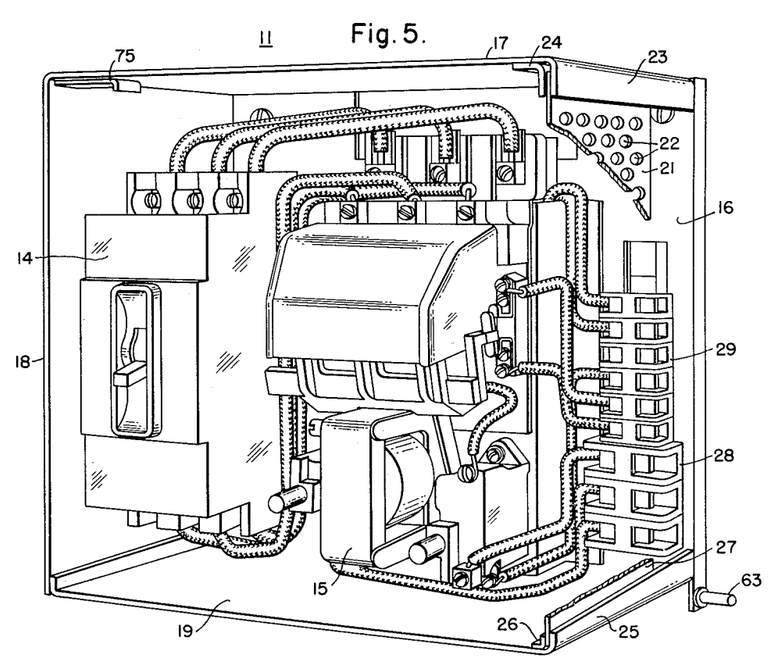
Fig. 5 is an enlarged view, in perspective, of one of the control apparatus units for mounting in the switchboard.

As shown, five apparatus units 11 are removably mounted in the left hand housing section 10. Two apparatus units 12 and 13 are mounted in the middle housing section, and all of the apparatus units have been removed from the right hand housing section. As shown in Figure 5, the particular apparatus units illustrated in the present drawings are motor starter units, each unit comprising a circuit breaker 14 and a motor starting device 15 of a type suitable for controlling the operation of an electric motor.

The apparatus units 11 are of a fixed height, for example, 14 inches. The apparatus unit 12 is 28 inches in height, and the apparatus unit 13 is 42 inches in height. Thus, by designing the apparatus units in multiples of a fixed dimension they may be readily interchanged for controlling motors of different ratings. One of the units 12 may be substituted for two of the units 11 or one of the units 13 may be substituted for three of the smaller units.

As shown in Figure 5 each apparatus unit comprises a rear wall 16, a top wall 17, a side wall 18 and a bottom wall 19. A removable side wall or baffle plate 21 may be provided with a plurality of perforations or openings 22 or it may be a grill made from heavy wire screen to provide for proper ventilation of the apparatus and at the same time prevent ignited gases from circulating between units.

The top of the baffle plate 21 is slidably disposed in a slot provided between a flange 23 on one edge of the top wall 17 and an angle bar 24 secured to the wall 17. The bottom of the plate 21 is slidably disposed in a slot provided between a flange 25 on the bottom wall 19 and an angle bar 26 secured to the bottom wall. The rear edge of the baffle plate 21 may be notched at 27 to clear wires connected to terminal blocks 28 and 29 mounted on the rear wall 16 of the unit.

Figures 2, 10, 11, 12:
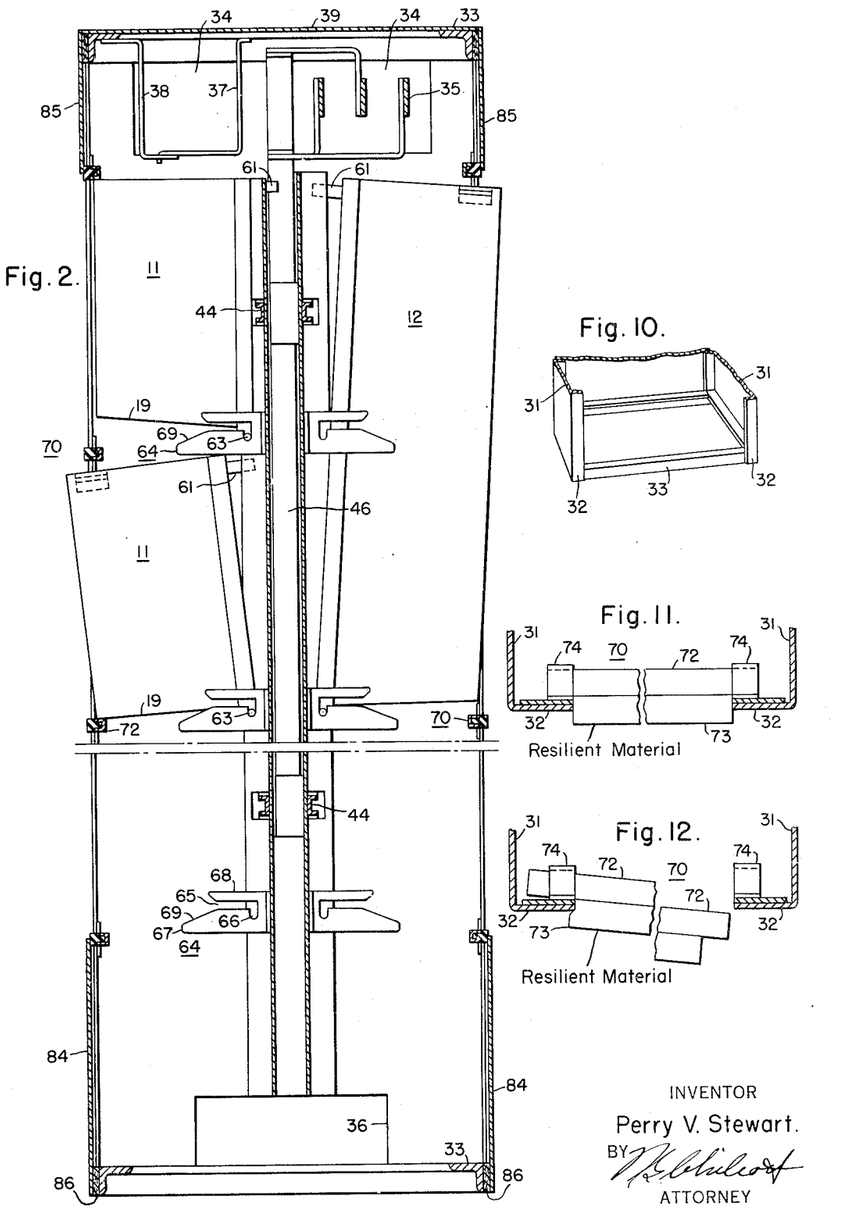
Fig. 2 is an enlarged view, partly in end elevation and partly in section, of the structure shown in Fig. 1.
Fig. 10 is a view, in perspective, of a portion of the housing structure.
Figs. 11 and 12 are enlarged detail views of a removable support bar utilized in the switchboard structure.
Figure 3:
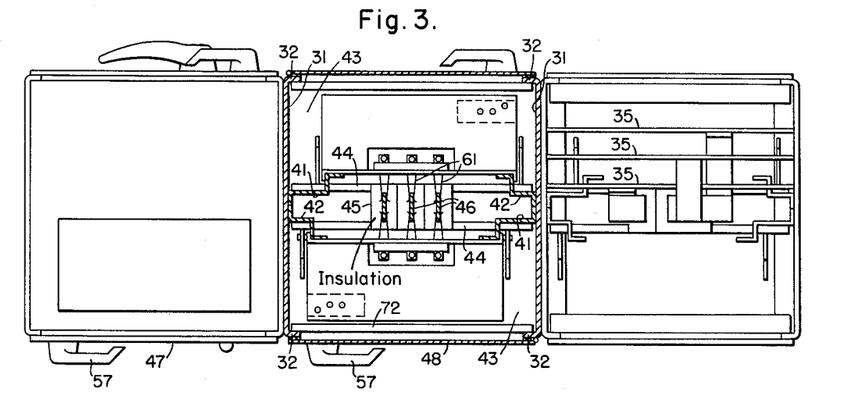
Fig. 3 is a view, partly in plan and partly in section, of the structure shown in Fig. 1.

As shown most clearly in Figure 3, each housing section comprises two spaced side sheets 31 having their vertical edges turned in to form flanges 32. As shown in Figure 10, the side sheets 31 are held in spaced relation by a rectangular frame 33, which is preferably composed of angle members, disposed inside the inturned edges 32 of the side sheets 31 and secured to the side sheets. A similar frame is provided at the top of the side sheets, thereby making each housing section self supporting.

Figure 6:
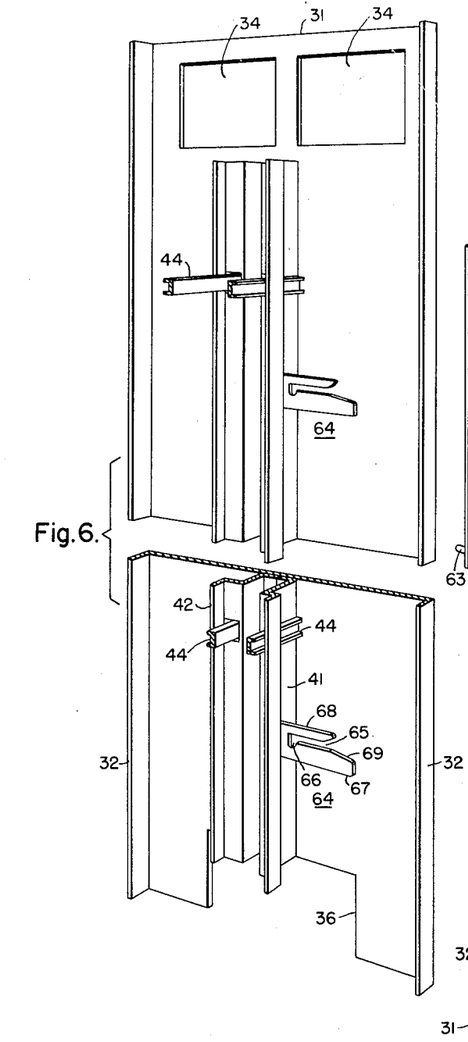
Fig. 6 is an enlarged view, in perspective, of one of the side sheets utilized in the switchboard structure.

As shown most clearly in Figure 6, rectangular openings 34 may be provided at the top of each side sheet 31 for horizontally disposed bus bars 35 (Fig. 2) or cables which extend between housing sections. The bottom of each side sheet 31 may be notched at 36 to permit the bus bars or cables to be located at the bottom of the housings if desired. As shown in Fig. 2, a trough comprising members 37 and 38, which may be attached to the top frame 33, is provided at the top of the housing to support cross panel wires and cable. A top cover plate 39 is provided for each housing section.

As shown most clearly in Figs. 3 and 6, two vertically disposed adapters 41 and 42 are secured to each side sheet 31. Each adapter is substantially of a Z-shape in cross section with an additional leg or flange disposed parallel to the main leg of the Z. The adapters 41 and 42 are similar in construction with the exception that the main leg of the Z of the adapter 41 is longer than the main leg of the adapter 42.

Thus, as shown in Fig. 3, by mounting the adapters 41 on the right hand side sheet as viewed from the door at the front and the rear, respectively, of each housing section the apparatus units which are supported by the adapters are offset to the left, thereby providing a vertical wiring gutter 43 between the side sheet and the right hand sides of the apparatus units. In this manner wires may extend substantially the full height of the housing in the wiring gutters 43 and may be readily connected to the terminal blocks 28 and 29 on the apparatus units.

As shown in Figs. 1 and 6, horizontally disposed support members 44 extend between the adapters on opposite side sheets and are secured to the adapters. Insulating members 45, which are attached to the support members 44, are provided for supporting vertically disposed bus bars 46 in each housing section. The vertical bus bars 46 may be connected to the horizontal bus bars 35 at the top of the housing.

As shown most clearly in Figs. 1 and 3, doors 47, 48 and 49 are provided on the front and the rear of the housing sections. The doors 47, 48 and 49 are of slightly greater height than the apparatus units 11, 12 and 13, respectively. In other words, in the present structure the doors 47 are 14 inches high, the doors 48 are 28 inches high and the doors 49 are 42 inches high.

Each door is mounted on the inturned flange 32 of one side sheet 31 by means of a full length hinge 51. The hinges may be secured to the side sheet by bolts inserted through openings 52 in the flange 32 of the side sheet. These openings are so spaced that doors 14 inches high or a multiple of 14 inches may be readily attached to the housing.

The doors are fastened to the flange 32 of the other side sheet for each housing by means of captive fasteners 53 (Fig. 13) which are of the cam type. Captive studs 54 (Fig. 4) are rotatably mounted in the doors. The studs 54 are rotated through an angle of 90° after being inserted into the fasteners 53 to secure the door in the closed position. As shown most clearly in Figs. 1 and 4, oblong openings 55 are provided in the flange 32 of the left hand side sheet for the studs 54 on the doors. These openings are so spaced that the fasteners on the doors may be spaced at a predetermined dimension or a multiple of that dimension.

A suitable interlocking mechanism 56 which is actuated by a handle 57 on each door is provided to prevent the door from being opened while the circuit breaker in the apparatus unit behind the door is closed. The handle 57 actuates a sliding member 58 disposed on the inside of the door and having spring members 59 thereon for engaging the handle of the circuit breaker 14 within the housing. The interlocking mechanism 56 is so constructed that it engages the inside of the flange 32 on one side sheet to prevent the door from being opened while the circuit breaker is closed. Thus, access to the apparatus unit is prevented while the circuit breaker is closed.

Figure 7:
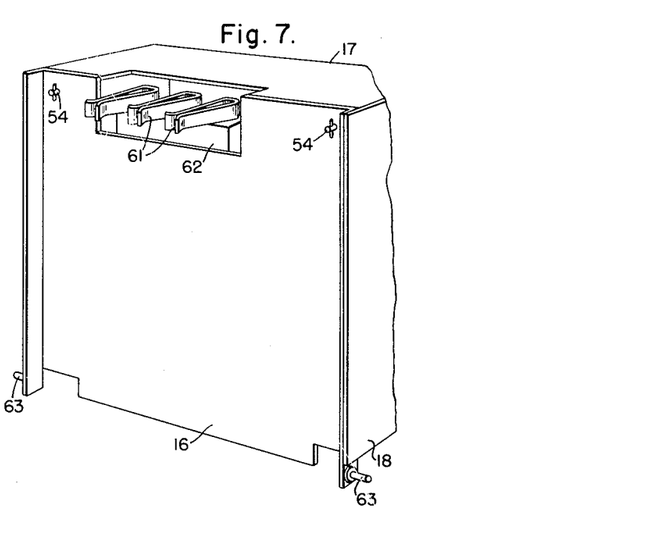
Fig. 7 is another enlarged view, in perspective, of one of the apparatus units.

As shown most clearly in Figs. 2 and 3, apparatus units are mounted in the front and the rear of each housing section. As explained hereinbefore, the apparatus units may be of a size suitable for controlling motors or other apparatus of a predetermined rating. As shown in Fig. 7, each apparatus unit is provided with three electrical connectors 61 of the stab type which extend through an opening 62 in the rear wall 16 of the unit. The connectors 61 are disposed to frictionally engage the vertical bus bars 46 when the apparatus unit is fully inserted into the operating position in the housing.

Since the apparatus units are disposed back-to-back in the housing, each set of bus bars 46 supplies power to apparatus units at the front and the rear of the housing, thereby reducing the amount of copper required for making the electrical connections to a relatively large number of apparatus units. Furthermore, the bus bars are substantially enclosed and protected by the adapters 41 and 42 and the apparatus units when they are inserted in the housing, thereby preventing accidental contact with the bus bars.

In order to facilitate the installation of the apparatus units in the housing, each apparatus unit is provided with oppositely disposed side pivot pins 63 at the two lower corners of the unit. As shown most clearly in Fig. 2, the pivot pins 63 are inserted into slotted and notched guide rails 64 secured to the adapters 41 and 42 at spaced intervals corresponding to the height of the smallest apparatus unit, which in the present case is 14 inches.

As shown in Fig. 6 each guide rail 64 has a slot 65 which terminates in a notch 66 at the rear of the slot 65. The portion 67 of the guide rail 64 below the slot 65 extends forwardly beyond the upper portion 68 of the guide rail and has a slightly inclined surface 69, as shown most clearly in Fig. 6.

An apparatus unit may be installed in the housing by resting the pivot pins 63 on the inclined surfaces 69 of the two oppositely disposed guide rails for that unit and pushing inwardly on the unit to cause the pins to enter the slots 65 and drop into the notches 66 at the rear of the slots. After the pins 63 are in the notches 66 the upper part of the unit is pushed inwardly to cause the stab connectors 61 to engage the bus bars 46.

The unit may be retained in the operating position by means of cam fasteners 53 similar to the fasteners provided on the doors 47. As shown in Fig. 7, a captive stud 54 is provided near each upper corner of an apparatus unit for insertion into fasteners 53 secured to the adapters 41 and 42. As shown in Fig. 1, oblong openings 71 are provided in the adapters for the insertion of the captive studs 54 on the apparatus unit. The openings 71 are spaced at intervals corresponding to the height of the smallest apparatus unit.

As shown most clearly in Fig. 2 horizontally disposed support bars 70 are provided between each apparatus unit and also at the top of the upper unit and at the bottom of the lower unit of each housing section. As shown most clearly in Fig. 13, each support bar 70 comprises a channel 72 in which a strip 73 of sponge rubber, or a similar resilient material, is secured. The rubber 73 seals the crack between the doors 47 for the apparatus units.

The ends of the channel 72 are slidably disposed in U-shaped brackets 74 secured on the inside of the flanges 32 on the side sheets 31. As shown in Figs. 11 and 12, a support bar may be readily removed by sliding it endwise to compress the rubber 73 sufficiently to permit one end of the channel 72 to be removed from the one bracket 74. Thus, all, or as many as desired, of the support bars 70 may be removed to permit ready access to the vertical wiring gutters or troughs 43 at the right side of each housing section.

As shown in Fig. 2, a support bar 70 functions to support the lower front corner of an apparatus unit when it is tilted forwardly to disengage the stab connectors 61 from the bus bars 46. As shown, the bottom wall 19 of the apparatus unit is slanted upwardly to permit the apparatus unit to be tilted forwardly sufficiently to disengage the stab connectors 61 from the bus bars 46.

If desired, an apparatus unit may be locked in the disconnected position by means of a locking plate 75 which is slidably mounted on the lower side of the top wall 17 of the apparatus unit. The locking plate 75 has a notch 76 in one end which straddles the flange 32 of the one side plate 31 when the apparatus unit is in the disconnected position and the locking plate 75 is moved to the left.

Figure 8:
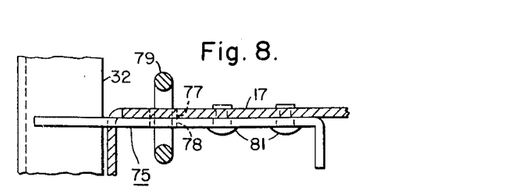
Fig. 8 is an enlarged detail view of a lock plate for an apparatus unit.
Figure 9:
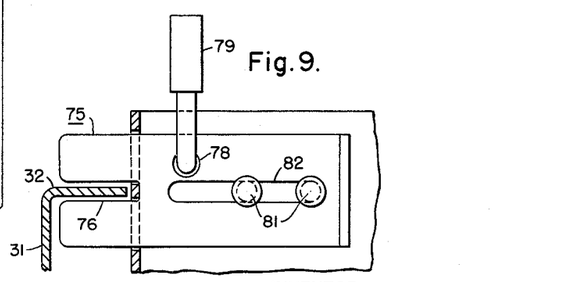
Fig. 9 is another enlarged detail view of the lock plate.

As shown in Figs. 8 and 9 a hole 77 is provided in the top wall 17 and a similar hole 78 is provided in the locking plate 75. These two holes are in alinement when the plate is moved to the left to engage the flange 32. A padlock 79 may be inserted through the holes 77 and 78, thereby locking the apparatus unit in the disconnected position. As shown in Figs. 8 and 9, the plate 75 may be attached to the top wall 17 by means of rivets 81 disposed in a slot 82 in the plate 75.

Figures 4, 13:
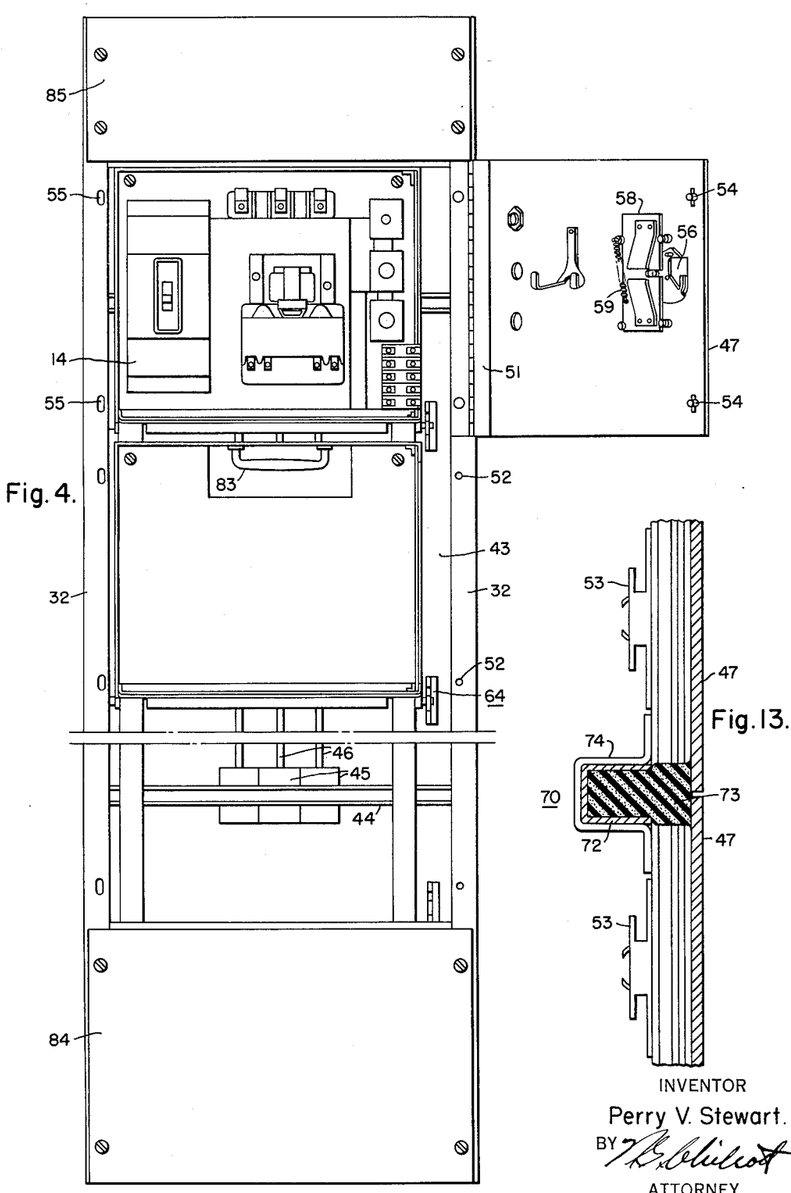
Fig. 4 is an enlarged view, in front elevation, of one of the switchboard housing units, shown in Fig. 1; part of the apparatus being removed for clearness.
Fig. 13 is an enlarged view, in section of the support bar and a portion of the switchboard structure.

As shown in Fig. 4 a handle 83 may be attached to the lower side of the top wall 17 of each apparatus unit to facilitate the handling of the units. As also shown in Fig. 4, a cover plate 84 is provided at the bottom of each housing section and a similar cover plate 85 is provided at the top of each housing section. Thus, each section is totally enclosed with the exception of the openings 34 and 36 in the side plates 31. Cover plates for these openings may be provided at the ends of each installation of a group of housing sections, thereby providing a totally enclosed installation. As shown in Fig. 2 strips 86 of felt, or similar material, may be provided between the cover plates 84 and 85 and the rectangular frames 33. The edges of the doors may also be sealed if desired, thereby making a substantially dust-proof housing.

As explained hereinbefore, the apparatus units may be readily installed in the housing and wiring connections made to the terminal blocks provided on each unit. The wires for making the external connections to the apparatus units may be disposed in the vertical wiring troughs 43 which extend practically the full length of the housing section. If desired, terminal blocks (not shown) may be provided at the bottom of each housing behind the cover plates 84 to facilitate the making of connections to outgoing cables. As previously explained, the support bars 72 may be removed while making the wiring connections to the terminal blocks on the apparatus units, thereby facilitating the installation of the wires.

Figure 14:
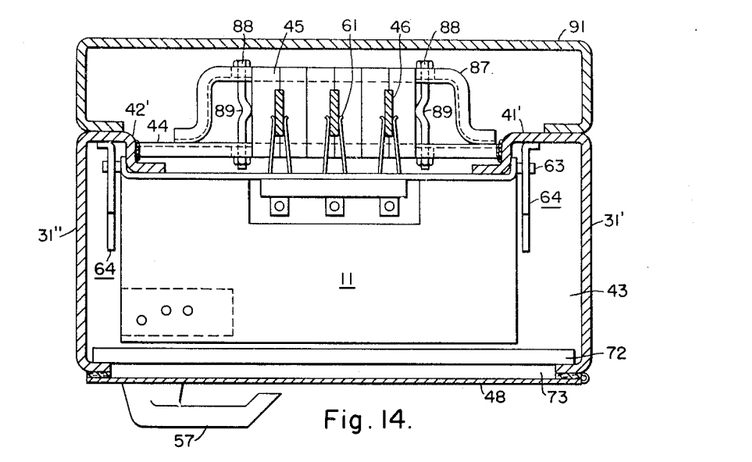
Fig. 14 is an enlarged view, in section of a modified housing section.

The structure shown in Fig. 14 may be utilized when it is not desired to mount the apparatus units 11 in both the front and the rear of each housing section. As shown, the adapter, marked 41' in Fig. 14 may be formed integrally with right-hand side sheet 31' and adapter 42' may be formed integrally with left-hand side sheet 31". As described hereinbefore, a part of the adapter 41' may be made longer than the corresponding part of the adapter 42', thereby providing the vertical wiring gutter 43 at the right-hand side of the housing.

As shown, the bus support members 44 and the guide rails 64 may be secured to the adapters, preferably by welding, for the purposes previously explained. A bracket 87 may be attached to each member 44 to aid in supporting the insulators 45 which, as previously explained, support the bus bars 46. A bolt 88 having an offset or crank portion 89 may be inserted through the support 44 and the bracket 87 at each side of the insulating blocks 45. The bolts may be turned to cause the crank portions 89 to engage the sides of the outer insulating blocks 45, thereby applying lateral forces to the insulators. A cover member 91 may be attached to the side sheets 31' and 31" at the rear to enclose the bus bars 46.

Figure 15:
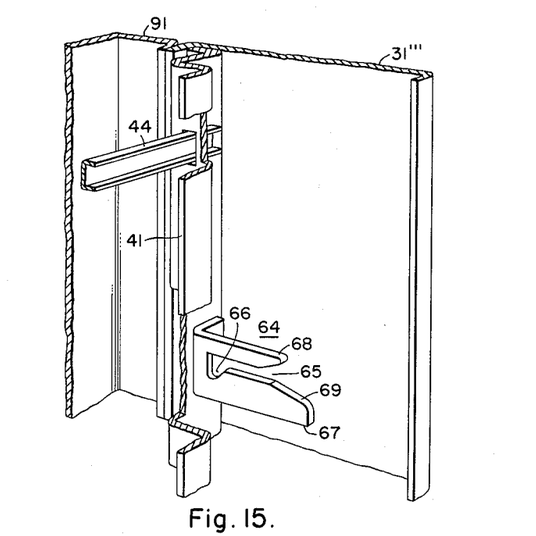
Fig. 15 is an enlarged view, in perspective of a portion of still another modification of the housing structure.

As shown in Fig. 15, a separate adapter or Z bar 41, such as previously described, may be attached to a right-hand side sheet 31" instead of being formed integrally with the side sheet. Likewise, a Z bar 42 may be attached to a similar left-hand side sheet and the two sheets disposed in spaced relation, thereby providing a structure similar to the one shown in Fig. 14. A cover 91 may be attached to the rear flanges of the side sheets as shown in Fig. 15.

As mentioned previously, the structures shown in Figs. 14 and 15 may be utilized when it is desired to mount apparatus units 11 in the front only of the housing section. If it is desired to mount apparatus units in both the front and the rear, the cover 91 may be omitted and additional sheets having either integrally formed adapters or separate adapters may be attached to the rear of the side sheets, thereby providing a housing section in which apparatus units may be installed in both the front and the rear of the housing. It will be understood that only one set of bus bars 46 and supports is required since the vertical bus bars may be positioned substantially midway between the front and the back of the housing with each of the vertical bus bars having opposed flat faces extending parallel to the sides of the housing and the contact jaws on the apparatus units extending over no more than one-half the width of the opposed flat faces of the bus bars.

From the foregoing description it is apparent that I have provided a switchboard structure in which a plurality of apparatus units of different sizes may be readily installed and in which the apparatus units may be interchanged if desired. The present structure permits the installation of a relatively large number of individual apparatus units in a relatively small amount of space and the housing units are so constructed that they may be installed individually or assembled in groups containing any desired number of housing units.

Since numerous changes may be made in the above described construction and different embodiments of the invention may be made without departing from the spirit and scope thereof, it is intended that all matter contained in the foregoing description or shown in the accompanying drawings shall be interpreted as illustrative and not in a limiting sense.

I claim as my invention:

1. A switchboard housing structure for supporting apparatus units, said structure comprising a pair of oppositely disposed spaced side sheets having inturned vertical edges, frame means disposed at the top and the bottom of the side sheets securing the side sheets in spaced relation, vertically disposed adapters of a generally Z-shaped cross section secured to the side sheets in opposed relation, horizontally disposed support members attached to said adapters, vertically disposed bus bars supported by said support members, guide members secured to the adapters to support the apparatus units, said adapters being of different widths to offset the apparatus units horizontally in the housing, and a plurality of doors at the front and the rear of the housing structure, each door being hinged to one inturned edge of one side sheet and fastened to an inturned edge of the other side sheet.

2. A switchboard housing structure for supporting apparatus units, said structure comprising a pair of oppositely disposed spaced side sheets having inturned vertical edges, frame means disposed inside the inturned edges at the top and the bottom of the side sheets and secured to the side sheets, vertically disposed adapters secured to said side sheets, guide members secured to the adapters to support the apparatus units, said adapters being of different widths to offset the apparatus units horizontally in the housing, a plurality of doors at the front and the rear of the housing structure, each door being hinged to one inturned edge of one side sheet and fastened to an inturned edge of the other side sheet, and each door being a predetermined height or a multiple of said height.

3. In a switchboard structure, in combination, a pair of oppositely disposed spaced side sheets having vertical edges, frame means disposed at the top and the bottom of the side sheets securing said sheets in spaced relation, adapters secured to the side sheets in opposed relation, horizontally disposed support members extending between the adapters on opposite side sheets and secured to said adapters, vertically disposed bus bars supported by said support members, guide members secured to said adapters, apparatus units removably disposed between the side sheets, pivot pins secured to the apparatus units and engaging said guide members to pivotally support the units, and electrical connectors on the apparatus units engaging said bus bars.

4. In a switchboard structure, in combination, a pair of oppositely disposed spaced side sheets having vertical edges, rectangular frames disposed at the top and the bottom of the side sheets and secured to the side sheets, adapters secured to the side sheets, horizontally disposed support members extending between the adapters on opposite side sheets and secured to said adapters, vertically disposed bus bars supported by said support members, slotted guide members secured to said adapters, apparatus units removably disposed between the side sheets, pivot pins secured to the apparatus units and disposed in the slots in the guide members to pivotally support the units, and electrical connectors on the apparatus units frictionally engaging said bus bars.

5. In a switchboard structure, in combination, a pair of oppositely disposed spaced side sheets having vertical edges, frame means disposed at the top and the bottom of the side sheets and secured to the side sheets, one or more horizontally disposed support members extending between the side sheets, vertically disposed bus bars supported by said one or more support members, pivot supports positioned between the side sheets back from the front vertical edges thereof, apparatus units removably disposed between the side sheets, pivot elements secured to the lower rear portions of the apparatus units, said pivot elements being removably disposed in the pivot supports to pivotally support the units, and electrical connectors on the upper portion of the back of the apparatus units frictionally engaging the bus bars.

6. In a switchboard structure, in combination, a pair of oppositely disposed spaced side sheets having vertical edges, rectangular frames disposed at the top and the bottom of the side sheets and secured to the side sheets, vertically disposed adapters secured to the side sheets, one or more horizontally disposed support members extending between the adapters on opposite side sheets and secured to said adapters, vertically disposed bus bars supported by said one or more support members, pivot supports positioned between the side sheets back from the front vertical edges thereof, apparatus units removably disposed between the side sheets, pivot elements secured to the back portion of the apparatus units and engaging said pivot supports to pivotally support the units at the rear thereof, electrical connectors on the apparatus units frictionally engaging said bus bars, and a horizontally disposed support bar removably attached to the side sheets for supporting the front edge of each apparatus unit when said connectors are disengaged from the bus bars by tilting the apparatus unit about its pivot elements.

7. In a switchboard structure, in combination, a pair of oppositely disposed spaced side sheets having inturned vertical edges, rectangular frames disposed at the top and the bottom of the side sheets and secured to the side sheets, vertically disposed adapters secured to the side sheets, horizontally disposed support members extending between the adapters on opposite side sheets and secured to said adapters, vertically disposed bus bars supported by said support members, guide members secured to said adapters, apparatus units removably disposed between the side sheets, pivot pins secured to the apparatus units and engaging said guide members to pivotally support the units, electrical connectors on the apparatus units frictionally engaging said bus bars, a horizontally disposed support bar removably attached to the inturned edges of the side sheets for supporting the front edge of each apparatus unit when said connectors are disengaged from the bus bars by tilting the apparatus unit about its pivot pins, and resilient material attached to each support bar, said bars being removable by horizontal movement to compress said resilient material.

8. In a switchboard structure, in combination, a pair of oppositely disposed spaced side sheets having vertical edges, frame means secured to the side sheets for tying the sheets together, vertically disposed inwardly extending portions secured to the side sheets intermediate their vertical edges, spaced horizontally disposed support members extending between said portions on opposite side sheets and secured to said portions, vertically disposed bus bars supported by said support members, guide members disposed between the side sheets, apparatus units removably disposed on the guide members between the side sheets, electrical connectors on the apparatus units engaging said bus bars, said apparatus units being offset horizontally to provide a vertical wiring trough between one of the side sheets and the apparatus units, and a removable baffle plate on the side of each unit adjacent the wiring trough.

9. In a switchboard structure, in combination, a pair of oppositely disposed spaced side sheets, frame means secured to the side sheets for tying the sheets together, vertically disposed inwardly extending portions secured to the side sheets, horizontally disposed support members extending between said portions on opposite side sheets and secured to said portions, vertically disposed bus bars supported by said support members, guide members disposed between the side sheets, apparatus units removably disposed on the guide members between the side sheets, electrical connectors on the apparatus units engaging said bus bars, said apparatus units being offset horizontally to provide a vertical wiring trough between one of the side sheets and the apparatus units, a terminal block on each apparatus unit adjacent the wiring trough, and a slidable grill disposed at the side of each apparatus unit between the terminal block and the wiring trough, said grills being removable to provide free access from the wiring trough to the terminal blocks.

10. In a switchboard structure, in combination, a pair of oppositely disposed spaced side sheets, frame means secured to the side sheets for tying the sheets together, vertically disposed inwardly extending portions secured to the side sheets, horizontally disposed support members extending between said portions on opposite side sheets and secured to said portions, vertically disposed bus bars supported by said support members, guide members disposed between the side sheets, apparatus units removably disposed on the guide members between the side sheets, electrical connectors on the apparatus units engaging said bus bars, said apparatus units being offset horizontally to provide a vertical wiring trough between one of the side sheets and the apparatus units, a terminal block on each apparatus unit, and a grill disposed at the side of each apparatus unit adjacent the terminal block, each grill having a notch in one edge thereof for wires disposed between the trough and the terminal block.

11. In a switchboard structure, in combination, a pair of oppositely disposed spaced side sheets, frame means secured to the side sheets, horizontally disposed support members supported by the side sheets vertically disposed bus bars supported by said support members, guide members disposed between the side sheets, apparatus units removably disposed on the guide members between the side sheets, electrical connectors on the apparatus units for frictionally engaging said vertical bus bars, each of said units being movable to disconnect the connectors from the bus bars, and latching means for each unit to retain the unit in the disconnected position, said latching means being manually movable independently of the operative condition of the apparatus on the unit.

12. In a switchboard structure, in combination, a pair of oppositely disposed spaced side sheets, frame means securing the side sheets in spaced relation, inwardly extending portions secured to the side sheets, bus bars vertically disposed between the side sheets, pivot supports on said portions, apparatus units having pivot elements thereon engaging said pivot supports to pivotally support the units between the side sheets, electrical connectors on the apparatus units frictionally engaging said vertical bus bars, each of said units being movable about its pivot elements to disconnect its connectors from the bus bars, and locking means on each unit for engaging one of said side sheets to retain the unit in the disconnected position.

13. In a switchboard structure, in combination, a pair of oppositely disposed side sheets secured in spaced relation, vertically disposed portions secured to the side sheets back from the front thereof, bus bars vertically disposed between the side sheets, insulating members supporting the bus bars, notched means secured to the vertically disposed portions, apparatus units having pivot members secured thereto adjacent the rear thereof and engaging said notched means to pivotally support the units between the side sheets, each apparatus unit with its pivot members being completely removable from the structure, and electrical connectors on the apparatus units frictionally engaging said bus bars, each of said units being movable about its pivot members to disconnect its connectors from the bus bars.

14. In a switchboard structure, in combination, a pair of oppositely disposed side sheets secured in spaced relation, bus bars vertically disposed between the side sheets, insulating members supporting the bus bars, apertured means disposed between the side sheets, apparatus units having pivot members secured thereto engaging said apertured means to pivotally support the units between the side sheets, electrical connectors on the apparatus units frictionally engaging said bus bars, each of said units being movable about its pivot members to disconnect its connectors from the bus bars, a lock receiving aperture on each unit for retaining the unit in the disconnected position, and each unit being completely removable with its pivot members from the switchboard structure.

15. In a switchboard structure, in combination, a pair of oppositely disposed side sheets secured in spaced relation to form a housing, each side sheet having vertical edges, bus bars vertically disposed between the side sheets, insulating members supporting the bus bars, one or more members disposed between the vertical edges of the side sheets and supported by the side sheets to support said insulating members, apparatus units removably disposed in the housing between the side sheets, electrical connectors on the apparatus units frictionally engaging said vertical bus bars, each of said units being insertable into the housing from in front of the housing, and a manually releasable latch mounted on a unit for engaging the housing to prevent the insertion of the unit into the housing beyond a predetermined distance, said latch being releasable independently of the operative condition of the apparatus on the unit.

16. In a switchboard structure, in combination, a pair of oppositely disposed side sheets secured in spaced relation to form a housing, each side sheet having vertical edges, bus bars vertically disposed between the side sheets, insulating members supporting the bus bars, one or more members disposed between the vertical edges of the side sheets and supported by the side sheets to support said insulating members, apparatus units removably disposed in the housing between the side sheets, electrical connectors on the apparatus units frictionally engaging said bus bars, each of said units being insertable into the housing from in front of the housing, and a manually operable latch for each unit for releasably retaining the unit in a position in which said connectors are disengaged from said bus bars, said latch being operable independently of the operative condition of the apparatus on the unit.

17. In control apparatus, in combination, a pair of oppositely disposed side sheets secured in spaced relation to form a housing, each side sheet having vertical edges, bus bars vertically disposed between the side sheets, insulating members supporting the bus bars, one or more members disposed between the vertical edges of the side sheets and supported by the side sheets to support said insulating members, apparatus units removably disposed in the housing between the side sheets, electrical connectors on the upper part of the apparatus units frictionally engaging the bus bars, pivot members adjacent the lower rear of the apparatus units supporting each apparatus unit when said connectors engage the bus bars, said units being movable about said pivot members to disengage said connectors from said bus bars, and a latch for releasably retaining a unit in the disengaged position.

18. In a switchboard structure, in combination, a pair of vertically disposed side sheets secured in spaced relation, each side sheet having an inwardly extending vertically disposed portion thereon intermediate the vertical edges of the sheet, a support member secured to said portion, bus bars vertically disposed between the side sheets, insulating members supporting the bus bars, an apparatus unit removably disposed between the side sheets, pivot means secured to the apparatus unit adjacent the lower rear thereof and engaging said support member to pivotally support the unit, electrical connectors on the upper rear of the apparatus unit for engaging said bus bars, and means limiting rotation of the upper end of the unit out of the housing to a small amount sufficient to safely disconnect the connectors from the bus bars.

19. In control apparatus, in combination, a pair of oppositely disposed side sheets secured in spaced relation to form a housing and having a cover removably disposed at the rear thereof, bus bars vertically disposed within the housing and protected by the cover, a member disposed between the side sheets for supporting the bus bars, apparatus units disposed in the housing between the side sheets and removable from the front of the housing, electrical connectors on the apparatus units frictionally engaging the bus bars, pivot members supporting each apparatus unit, each unit being tiltable about said pivot members to an inclined position to disengage the connectors from the bus bars, said units being offset in the housing to provide a vertical wiring gutter between one of the side sheets and the apparatus units, and horizontal members removably disposed in the housing between the units to aid in supporting said units when they are tilted to the inclined position.

20. In control apparatus, in combination, a pair of vertically disposed side sheets secured in spaced relation, bus bars vertically disposed between the side sheets, insulating members supporting the bus bars, horizontal members supported by the side sheets to support said insulating members, apparatus units removably disposed between the side sheets and electrically connected to the bus bars, and doors corresponding in height to said units hinged to one of said side sheets, a unit being removable while its corresponding door is in place but in open position, said units being offset horizontally providing a vertical wiring channel behind the door and between one of the side sheets and the apparatus units, adjacent doors having the top edge of one substantially abutting the lower edge of the next to cover the wiring channel and space for the removable units when the doors are closed and the units are removed.

21. In control apparatus, in combination, a pair of vertically disposed side sheets secured in spaced relation, bus bars vertically disposed between the side sheets, insulating members supporting the bus bars, horizontal members supported by the side sheets to support said insulating members, apparatus units removably disposed between the side sheets and electrically connected to the bus bars, doors corresponding in height to said units hinged to one of said side sheets, each unit being removable while its corresponding door is in place but in open position, said units being spaced from one of the side sheets to provide a vertical wiring channel behind the door and between said side sheet and said units, and a barrier disposed at one side of each unit, said barrier having an opening therein adjacent to said wiring channel.

22. In control apparatus, a vertically standing housing, a plurality of vertical power supply bus bars mounted in the housing and spaced laterally from each other in a direction generally parallel to the front of the housing, a plurality of electrical control units positioned one above the other in the housing in front of the bus bars, electrical line connections extending rearwardly from the back of each unit to the bus bars therebehind, supporting elements discrete from said electrical line connections removably mounting each unit in the housing for removal from the front of the housing, an individual door over each unit openable to give access to its unit while the unit is electrically connected to the bus bars and without exposing the front of other units, each of said individual doors being mounted on the housing to permit removal of the unit when the door is open and each of said doors being closable when its unit is removed to cover the space from which the unit was removed, a wiring channel in the housing extending vertically between one side of each of the electrical control units and the adjacent side of the housing, said wiring channel being positioned adjacent the front of the housing, and said wiring channel being accessible from the front of the housing for the pulling of wires into the channel, and an open space extending laterally from each of a plurality of said electrical control units into the wiring channel to permit load conductors to extend from the wiring channel laterally into the units for electrical connection thereto.

23. In control apparatus, a vertically standing housing, a plurality of vertical power supply bus bars mounted in the housing and spaced laterally from each other in a direction generally parallel to the front of the housing, a plurality of electrical control units positioned one above the other in the housing in front of the bus bars, electrical contact jaws extending rearwardly from the back of each unit and making a frictional disengageable connection directly with said bus bars behind the unit, supporting elements discrete from said electrical contact jaws removably mounting each unit in the housing for removal from the front of the housing, an individual door over each unit openable to give access to its unit while the unit is electrically connected to the bus bars and without exposing the front of other units, each of said individual doors being hinged at one side on the housing independently of its unit to permit removal of the unit when the door has been swung open and while it remains hinged to the housing and each of said doors being closable when its unit is removed to cover the space from which the unit was removed, a wiring channel in the housing extending vertically between one side of each of the electrical control units and the adjacent side of the housing, said wiring channel being positioned adjacent the front of the housing, and said wiring channel being accessible from the front of the housing for the pulling of wires into the channel, and an open space extending laterally from each of a plurality of said electrical control units into the wiring channel to permit load conductors to extend from the wiring channel laterally into the units for electrical connection thereto.

24. In control apparatus, a vertically standing housing, a plurality of vertical power supply bus bars mounted in the housing and spaced laterally from each other in a direction generally parallel to the front of the housing, a plurality of electrical control units positioned one above the other in the housing in front of the bus bars, electrical line connections extending rearwardly from the back of each unit to the bus bars therebehind, supporting elements discrete from said electrical line connections removably mounting each unit in the housing for removal from the front of the housing, an individual door over each unit openable to give access to its unit while the unit is electrically connected to the bus bars and without exposing the front of other units, each of said individual doors being mounted on the housing to permit removal of the unit when the door is open and each of said doors being closable when its unit is removed to cover the space from which the unit was removed, a wiring channel in the housing extending vertically between one side of each of the electrical control units and the adjacent side of the housing, said wiring channel being positioned adjacent the front of the housing, and said wiring channel being behind the doors and having a substantially open front accessible from the front of the housing for the pulling of wires into the channel when the doors are open and being covered by the doors when the doors are closed, and an open space extending laterally from each of a plurality of said electrical control units into the wiring channel to permit load conductors to extend from the wiring channel laterally into the units for electrical connection thereto.

25. In control apparatus, a vertically standing housing, a plurality of vertical power supply bus bars mounted in the housing and spaced laterally from each other in a direction generally parallel to the front of the housing, a plurality of electrical control units positioned one above the other in the housing in front of the bus bars, electrical contact jaws extending rearwardly from the back of each unit and making a frictional disengageable connection directly with said bus bars behind the unit, supporting elements discrete from said electrical contact jaws removably mounting each unit in the housing for removal from the front of the housing, an individual door over each unit openable to give access to its unit while the unit is electrically connected to the bus bars and without exposing the front of other units, each of said individual doors being hinged at one side on the housing independently of its unit to permit removal of the unit when the door has been swung open and while it remains hinged to the housing and each of said doors being closable when its unit is removed to cover the space from which the unit was removed, an operating handle pivotally mounted on the front of each of a plurality of the doors, each of said handles having a portion extending through its door and having a disengageable connecting member on the inside of the door making connection with its electrical control unit for operating the control unit when the door is closed, said connecting member automatically disengaging the electrical control unit when the door is swung open on its hinges so as not to interfere with removal of the unit, a wiring channel in the housing extending vertically between one side of each of the electrical control units and the adjacent side of the housing, said wiring channel being positioned adjacent the front of the housing, and said wiring channel being accessible from the front of the housing for the pulling of wires into the channel, and an open space extending laterally from each of a plurality of said electrical control units into the wiring channel to permit load conductors to extend from the wiring channel laterally into the units for electrical connection thereto.

26. In control apparatus, a housing including a pair of vertical oppositely disposed side sheets, members secured to the side sheets and holding them spaced apart, vertically extending portions extending inwardly from the pair of opposed side sheets along a line spaced back from the front edges of the side sheets, one or more horizontally disposed support members extending between the inwardly extending portions on the opposite side sheets, vertically disposed bus bars supported on said one or more support members, a plurality of guide members supported at intervals along said inwardly extending portions on the side sheets, each of said guide members extending horizontally toward the front of the housing and having a guide surface thereon, and said guide members at at least one side of the housing being spaced from the adjacent side sheet with an open space between the front ends of the guide members and the adjacent side sheet to permit wiring to be moved laterally into the space between said guide members and said adjacent side sheet, a plurality of apparatus units removably mounted in the housing, each of said apparatus units having portions engaging and movable along the guide surfaces of a pair of said guide members as the apparatus unit is moved into the housing from the front thereof, and each of said apparatus units having electrical contact jaws projecting from the back thereof and frictionally engaging directly on said vertical bus bars as the apparatus unit is moved back in the housing.

27. In control apparatus, a vertically standing housing, a plurality of vertical power supply bus bars mounted in the housing and spaced laterally from each other in a direction generally parallel to the front of the housing, each of said bus bars having opposed flat faces extending parallel to the sides of the housing, a plurality of electrical control units positioned one above the other in the housing in front of the edges of the vertical bus bars, electrical contact jaws extending rearwardly from the back of each unit and making frictional disengageable connection directly with the opposed flat faces of the vertical bus bars behind the unit, said contact jaws when in engaged position extending over no more than one-half the width of the opposed flat faces of the bus bars, supporting elements removably mounting each unit in the housing for removal from the housing, and an individual door over each of a plurality of said removable units.

28. In control apparatus, a vertically standing housing, a plurality of vertical power supply bus bars mounted in the housing and spaced laterally from each other in a direction generally parallel to the front of the housing, said bus bars being positioned substantially midway between the front and back of the housing, each of said bus bars having opposed flat faces extending parallel to the sides of the housing, a plurality of electrical control units positioned one above the other in the housing in front of the edges of the vertical bus bars, electrical contact jaws extending rearwardly from the back of each unit and making frictional disengageable connection directly with the opposed flat faces of the vertical bus bars behind the unit, said contact jaws when in engaged position extending over no more than one-half the width of the opposed flat faces of the bus bars, one or more additional electrical control units positioned in the housing from the rear thereof behind the rear edges of the vertical bus bars and having electrical contact jaws making frictional disengageable connection directly with the said opposed flat faces of the same vertical bus bars engaged by the first-mentioned units and being directly behind the contact jaws of one of the first-mentioned units and extending over no more than the other half of the width of the opposed flat faces of the bus bars, supporting elements removably mounting each unit in the housing for removal from the housing, and an individual door over each of a plurality of said removable units.

References Cited in the file of this patent

UNITED STATES PATENTS

| | | |
|---|---|---|
| 1,379,767 | Krantz | May 31, 1921 |
| 2,020,913 | Schramm | Nov. 12, 1935 |
| 2,147,023 | Frank | Feb. 14, 1939 |
| 2,319,415 | Lightfoot | May 18, 1943 |
| 2,359,247 | Rowe | Sept. 26, 1944 |
| 2,440,824 | Jackson | May 4, 1948 |
| 2,542,853 | Willis | Feb. 20, 1951 |